US009443515B1

(12) United States Patent
Boyce

(10) Patent No.: US 9,443,515 B1
(45) Date of Patent: Sep. 13, 2016

(54) PERSONALITY DESIGNER SYSTEM FOR A DETACHABLY ATTACHABLE REMOTE AUDIO OBJECT

(76) Inventor: Paul G. Boyce, Sedona, AZ (US)

(*) Notice: Subject to any disclaimer, the term of this patent is extended or adjusted under 35 U.S.C. 154(b) by 552 days.

(21) Appl. No.: 13/604,607

(22) Filed: Sep. 5, 2012

(51) Int. Cl.
| G10L 21/00 | (2013.01) |
| G10L 25/00 | (2013.01) |
| G10L 15/22 | (2006.01) |
| G10L 15/26 | (2006.01) |

(52) U.S. Cl.
CPC ............. G10L 15/22 (2013.01); G10L 15/265 (2013.01)

(58) Field of Classification Search
CPC .............................. G10L 15/22; G10L 15/265
USPC .................................................. 704/270, 275
See application file for complete search history.

(56) References Cited

U.S. PATENT DOCUMENTS

| 4,696,653 A | 9/1987 | McKeefery |
| 4,799,171 A | 1/1989 | Cummings |
| 5,009,626 A | 4/1991 | Katz |
| 5,029,214 A | 7/1991 | Hollander |
| 5,802,488 A | 9/1998 | Edatsune |
| 5,873,765 A | 2/1999 | Rifkin et al. |
| 6,012,961 A | 1/2000 | Sharpe, III et al. |
| 6,356,867 B1 | 3/2002 | Gabai et al. |
| 6,385,584 B1 | 5/2002 | McAllister et al. |
| 6,477,580 B1 | 11/2002 | Bowman-Amuah |
| 6,585,556 B2 | 7/2003 | Smirnov |
| 8,172,637 B2 | 5/2012 | Brown |
| 2002/0068500 A1* | 6/2002 | Gabai ..................... A63F 13/12 446/176 |
| 2002/0086612 A1 | 7/2002 | Chan |
| 2003/0055653 A1* | 3/2003 | Ishii et al. ..................... 704/275 |
| 2004/0010409 A1* | 1/2004 | Ushida et al. ................ 704/246 |
| 2004/0014014 A1 | 1/2004 | Hess |
| 2004/0152394 A1 | 8/2004 | Marine et al. |
| 2004/0153211 A1* | 8/2004 | Kamoto et al. ............... 700/245 |
| 2005/0102066 A1* | 5/2005 | Watanabe et al. ............ 700/264 |
| 2005/0219068 A1* | 10/2005 | Jones et al. ..................... 341/50 |
| 2006/0122834 A1* | 6/2006 | Bennett ......................... 704/256 |
| 2007/0035412 A1 | 2/2007 | Dvorak et al. |
| 2007/0239459 A1 | 10/2007 | Horvitz |
| 2008/0183678 A1 | 7/2008 | Weston |
| 2008/0300886 A1* | 12/2008 | Patch ............................ 704/275 |

(Continued)

FOREIGN PATENT DOCUMENTS

| WO | 9932203 | 7/1999 |
| WO | 0123385 A1 | 2/2001 |
| WO | 2008096134 A2 | 8/2008 |

Primary Examiner — Farzad Kazeminezhad
(74) Attorney, Agent, or Firm — Invention To Patent Services; Alex Hobson

(57) ABSTRACT

A personality designer system for making a remote object produce phrases consistent with a designed personality is described. The personality designer program allows a person to select a particular character, particular personality traits, specific phrases, create their own phrases, provide input levels for specific personality traits or any suitable combination of input or selection options described. As an example, a plurality of personalities may be described and a person may select a desired personality for their remote audio object. The plurality of personalities may include characters from history, celebrities, politicians, or fictional characters from books, television or movies, for example. The remote audio object is a detachably attachable object and comprises a speaker for emitting the selection of phrases or personality, and may be configured on, or placed near or in any suitable object including a pet collar, toy, car, plant and the like. In one embodiment, the remote audio object is a dog collar.

28 Claims, 13 Drawing Sheets

(56) References Cited

U.S. PATENT DOCUMENTS

| | | |
|---|---|---|
| 2009/0029743 A9 | 1/2009 | Lair et al. |
| 2009/0117816 A1 | 5/2009 | Nakamura |
| 2009/0124165 A1 | 5/2009 | Weston |
| 2009/0275408 A1 | 11/2009 | Brown |
| 2011/0021109 A1 | 1/2011 | Le et al. |
| 2012/0149359 A1* | 6/2012 | Huang .......... 455/420 |
| 2012/0185254 A1 | 7/2012 | Biehler et al. |

* cited by examiner

| Verbal Input | Are you hungry? | Trait Values | (0-10) | | | Target |
|---|---|---|---|---|---|---|
| Word detect | hungry | Complimentary | Critical | Encouraging | Sarcastic | Words |
| Response 1 | I can't wait for my delicioius food. | 7 | 0 | 8 | 0 | Breakfast Lunch Dinner Hungry Food. |
| Response 2 | Same old crummy food again? | 0 | 10 | 1 | 0 | Breakfast Lunch Dinner Hungry Food. |
| Response 3 | Of course I'm hungry, I have to beg to get fed around here. | 0 | 7 | 2 | 7 | Breakfast Lunch Dinner Hungry Food. |
| Response 4 | Please, please feed me, I'm really hungry. | 0 | 3 | 10 | 0 | Breakfast Lunch Dinner Hungry Food. |

FIG. 12A

| Verbal Input | Want to go for a walk? | Trait Values | (0-10) | | | |
|---|---|---|---|---|---|---|
| Word detect | Walk | Complimentary | Critical | Encouraging | Sarcastic | Target Words |
| Response 1 | I can't wait to go for a walk, lets go! | 6 | 0 | 10 | 0 | Walk |
| Response 2 | I would rather stay her and scratch myself. | 0 | 3 | 0 | 10 | Walk Out |
| Response 3 | It is about time, I've been in cooped up in this house all day. | 0 | 7 | 6 | 10 | Walk Out |
| Response 4 | I'm not sure if I want to be seen in public with you in that outfit. | 0 | 9 | 0 | 7 | Walk Out Park |

FIG. 12B

PERSONALITY DESIGNER SYSTEM FOR A DETACHABLY ATTACHABLE REMOTE AUDIO OBJECT

BACKGROUND OF THE INVENTION

1. Field of the Invention

The present invention relates to a personality designer system for making remote objects appear to talk and exhibit a user designed personality, and in particular, pets, where the remote audio object is a pet collar.

2. Background

Making remote objects appear to talk has been incorporated into toys, such as dolls and pet collars. Many of these remote objects are configured to emit a word or phrase through a speaker when activated by button on the remote object, through some other physical interaction, or when activated wirelessly by a remote electronic device. These remote objects typically have a set of words or phrases that are randomly emitted from a speaker and the person interacting with the object has no input or control over the type of personality the remote object exhibits. Typically, the phrases and the derived personality therefrom is pre-loaded into the remote object. In other cases, a remote object may comprise a speech recognition capability that enables the remote object to apparently respond to a verbal input. A person interacting with the remote object still does not have the capability, however, to influence the type or frequency of responses emitted from the remote object. The type and frequency of responses produced by existing remote objects, and the personality derived therefrom is pre-programmed.

There exists a need for a remote object audio device that can produce words or phrases and a means to select or alter the personality of the remote object, or the type and frequency of responses emitted therefrom.

SUMMARY OF THE INVENTION

The invention is directed to a personality designer for a remote audio object. The personality designer described herein provides a person the ability to select a particular personality or to select or provide preferences to specific personality traits. For example, in one embodiment, a plurality of personalities are described and a person may select a desired personality for their remote object. The plurality of personalities may include characters from history, celebrities, politicians, or fictional characters from books, television or movies, for example. Character personalities may sound like the character when emitted from the remote object. For example, a person may select Jack Nicholson as a character and the phrases emitted by the remote object may have the distinctive Jack Nicholson voice. In addition, this particular character may be quick-witted and sometimes sarcastic for which Jack Nicholson is known. In addition, phrases a character is known for may be incorporated into the phrases emitted by the remote object. The plurality of personalities may comprise personalities having any suitable accents, such as Hispanic, Italian, German, country or southern, and the like. For example, a person may select a Scottish man as their personality, and the phrases emitted may have a man's voice with a Scottish accent.

In another embodiment, a person may select or provide preferences to a plurality of personality traits. For example, a person may select from the following list of personality traits: gender, male, female, age, humorous, sarcastic, motivating, supportive, critical, polite, rude, vulgar, energetic, lazy, agreeable, confrontational, stubborn, direct, indirect, innocent, streetwise, controlling, kind, angry, confident, enthusiastic, patient, determined, loving, hopeful, sad, anxious, worried, stressed, easy going, relaxed, wound up, bossy, mean and the like. Any suitable number of personality traits may be provided by the personality designer program including, but not limited to, more than two, more than four, more than eight, more than ten, more than twenty, more than thirty and any range between and including the number of personality traits listed. The personality designer program and the user selection feature may provide a user with any number of personality input features for designing a personality. As described, a person may simply use a character input feature, whereby a particular personality from a plurality of described personalities, including in some embodiments well known characters, may be selected.

The personality designer program may comprise a selection input feature that enables a person to simply select the personality traits that they desire, and the personality designer will compile a selection of phrases that reflect the user's selections. The number of traits that may be selected may be limited in some embodiments. For example, more than about four, more than about six, or more than about ten personality traits may be selected by the user in a selection type input method. For example, an extensive list of personality traits may be provided in the personality designer program and a person may be directed to select their top ten traits. Selection of the top ten traits will create a unique personality having a selection of phrases that are reflective of the personality traits selected.

In another embodiment, the personality designer program comprises a level input feature, whereby a user can provide an indication of how prominent they want a particular trait included in the personality. A person may input a numerical value or some other level indicator for a personality trait. For example, a person may give a complimentary personality trait an input value of ten, and a critical personality trait an input value of zero. The personality designed by this selection would thereby be more complimentary and comprise more complimentary phrase than critical phrases. Any suitable level input may be provided for an individual personality trait. For example, a person may simply provide a low, medium, or high input for each trait.

In still another embodiment, a personality designer program may direct a person to rank personality traits with a ranking input feature. For example, a list of personality traits may be provided by the personality designer program and a person may be directed to rank their top ten traits, where a ranking of one is the highest preference trait. The personality designed by the personality designer program would thereby have more phrases that were representative of the number one ranked trait than the number ten ranked trait.

The personality designer may allow a person to provide a preference selection between two opposing types of personality traits. For example, a person may be provided with the option of providing an input between energetic and lazy. A sliding bar or scale or any other suitable means of providing an input for the preference between two opposing personality traits may be used, and is referred herein as a weighted input feature.

In yet another embodiment, the personality designer program comprises a compilation input feature, whereby a person may select one or more phrases for inclusion in the selection of phrases emitted by the remote audio object. The phrases may be provided to the user as text on a display screen, and/or the personality designer program may provide a sampling of audio phrases. A user may select a phrase that is displayed as text and request to hear the audio of the phrase. Some phrases may already have a particular personality characteristic, such as an accent or a character likeness. In one embodiment, a selected phrase may be voice synthesized, and may be synthesized according to other personality traits the user selects, such as a Scottish man, for example, where the emitted typed in phrase will sound like a Scottish man.

In still another embodiment, the personality designer program comprises a personalization input feature that allows a user to input their own phrases. The personality designer program may provide a user with an input option, whereby they may type in a phrase or record a phrase for inclusion in the selection of phrases emitted by the remote audio object. When a phrase is inputted by typing, the phrase may be voice synthesized, and may be synthesized according to other personality traits the user selects, such as a Scottish man, for example, where the emitted typed in phrase will sound like a Scottish man.

Any suitable combination of phrase input features described herein may be used to create a selection of phrases, or personality, and is referred to as a combination input feature. For example, a user may initially select a number of personality traits using a selection input feature and subsequently rank a least a portion of the selected traits using a ranking input feature, or provide some level of input using a level input feature as described herein. In another example, a person may use the character input feature to select a particular character and subsequently use a compilation input feature to select one or more specific phrases that they want included in a selection of phrases, or use a personalization input feature to create their own unique phrases for inclusion in the personality.

A user may interface with the personality designer program in any suitable way according to the various embodiments described herein. For example, a person may use a display screen and any suitable personality input feature to make selections or provide input. The remote audio object may comprise a display screen having a touch screen type user input feature. In an exemplary embodiment, a user may interface with the personality designer program via a remote electronic device, such as a mobile telephone.

The personality designer program and/or control program may comprise any number of phrases for selection including, but not limited to more than 20, more than 60, more than 100, more than 500, more than 1,000, more than 10,000, and any range between and including the number of phrases provided. The personality designer program may assign each phrase a corresponding trait value for how strongly the phrase exhibits a particular personality trait. For example, a compliment type phrase may have a high complimentary trait value, such as 100, and have an insult trait value of zero. Likewise a phrase may be categorized by the personality designer program as either male or female, for example.

The personality designer program may create a selection of phrases based on a users input and an algorithm to determine which phrases best match the personality traits the user desires for their remote audio object. The number of phrases selected for the most desired personality trait, may be higher than the number of phrases having a high trait value for a less desirable personality trait. In addition, the personality designer system may more frequently emit phrases with the best matching trait values to the user's input. In addition, the personality designer system may randomly play phrases from the selection of phrases, or phrases may be played as a function of a word or phrase recognized from a verbal input.

The personality designer program may provide a user with a search feature, whereby they can input personality traits and based on a phrase trait value, the phrase may be displayed or displayed in a ranked arrangement for the user to review. Likewise, when a user uses one of the input features described herein, the personality designer program may run an algorithm to select the phrases that best match and have the highest trait values for the personality traits the user selected and/or provided input, such as a level value.

The remote object, as described herein, comprises a speaker and, in most embodiments, a housing. In one embodiment, the remote object comprises an electronic memory comprising the plurality of words or phrases that may be emitted by the speaker. The electronic memory may be a portable memory device, such as an SD card, USB memory stick and the like. A person may insert different portable memory devices to change the personality of the remote object, or they may load a new personality onto a portable electronic memory device. For example, a person may use an electronic device, such as a computer, to select a personality and then load this personality, or plurality and frequency of phrases, onto the portable electronic memory device. In one embodiment, a person may access a website to select a personality. In another embodiment, a person may connect a remote audio object, as described herein, to an electronic device. Wherein the remote audio object comprises an interface feature whereby a personality may be inputted to the remote audio object through said interface feature connected with a remote electronic device by an interface cable. In another embodiment, the remote object comprises a user interface feature, whereby a user can select a personality directly on the remote object. Any combination of components of a personality designer system may be configured by a remote audio object as described herein. In one embodiment, a number of components including, but not limited to, a speaker, electronic memory, control system, and personality designer program are all configured on the remote audio object, as described herein. In another embodiment, only the speaker and a portion of the control system are configured on the remote audio object.

The personality designer for remote audio objects comprises a control system for controlling any number of functions including what phrase and when a phrase is emitted by the speaker. The phrase emitted by the speaker may be a pre-recorded phrase, or may be a voice synthesized phrase or response. In one embodiment, the selection of phrases, or personality as described herein, consists of pre-recorded phrases. In another embodiment, the personality consists of voice synthesized phrase. A plurality of pre-recorded phrases that define a personality, having the desired personality traits, including accents, may be saved or loaded onto the electronic memory. A voice synthesized phrase or response may be generated by the control program, and in particular, an artificial intelligence type program may be configured to provide any number of phrases and/or responses as a function of verbal input. In addition, the personality traits, including accent preferences, may be incorporated into the type of response or phrase synthesized by the artificial intelligence program. The control system comprises a control program that may be configured on the remote audio object or on a remote electronic device. The control system further comprises a personality designer program comprising a user selection feature. A user selection feature allows a person to select a personality, such as by selecting a described personality, or by providing preference inputs to a plurality of personality traits, as described herein.

A remote object, as described herein may be any remote object having a speaker and the means to emit a plurality of phrases from said speaker, whereby the type and frequency of phrases emitted defines a personality. A remote object, as described herein, may be placed in or near a toy, a pet collar, a plant, computer, a car, a purse, a coat, a hat or any other suitable object. In an exemplary embodiment, the remote object is configured on a pet collar, such as a dog collar. In one embodiment, the remote object comprises a remote electronic device comprising an activation feature, whereby a user can activate the remote object to emit a phrase. The activation feature may be any suitable button or switch, and may be a sound activated feature, whereby when a sound loud enough to trigger the sound sensor is received, the remote object emits a phrase. In yet another embodiment, the remote object comprises a microphone and speech recognition software, whereby when a pre-defined word or phrase is detected by the speech recognition software, a phrase, and in some cases a particular phrase is emitted by the remote object.

A remote electronic device may be configured to work only with the remote audio object, such as a wireless transmitter having one or more buttons for activating the remote audio object to emit a phrase. In another embodiment, the remote electronic device may be a mobile electronic device configured for any number of other functions, such as a mobile telephone. A mobile telephone, tablet computer and the like may be configured to send a wireless signal, such as a Bluetooth signal, to the remote audio object. In this embodiment, the remote electronic device may be configured with the electronic memory of phrases, or may obtain the phrases from a wireless connection with a website. For example, in one embodiment, a mobile telephone is configured with an application that comprises an electronic memory for a plurality of phrases, or a personality. An application is a software program on a mobile electronic device. An application may run solely on the mobile electronic device or may interface with a website. An application may also comprise a personality designer program described herein, whereby the person can change or alter the personality on the mobile phone. In yet another embodiment, a mobile phone may connect to a website through a wireless connection, whereby the person can change or alter the personality for their remote audio object on the website.

The personality designer system for a remote audio object may comprise speech recognition software, whereby when a word or phrase is detected by the speech recognition software, a phrase and in some cases a particular phrase is emitted by the speaker. The speech recognition software described herein may be configured to detect any number of words including one, two, three, four, more than five, more than ten, more than twenty, more than fifty, more than one hundred and any number between and including the number of words listed. In one embodiment, the speech recognition software is designed to detect the approximate number of words and phrases that a pet owner speaks to their dog, such as about sixty. In one embodiment, the speech recognition software and a microphone are configured in the remote audio object. In another embodiment, the microphone and speech recognition software are configured on a remote electronic device whereby a code or phrase is sent from the remote electronic device to the remote audio object. A code may be sent wirelessly to the remote audio object, wherein the code signals the remote audio object to emit a phrase. The phrase emitted by the remote audio object as a function of a detected word may appear to be a response. The response may be a question, whereby the control program of the personality designer system directs the speech recognition software to detect an answer, such as yes or no. When the speech recognition software detects a suitable answer to the response question, another response may be emitted by the remote audio object. In this manner, it may appear that the remote audio object is conversing with a person. This series of question and answer may be programmed to continue for any suitable number of iterations including one, two, more than three, more than five more than ten and any range between and including the number of iterations listed.

The personality designer system for a remote audio object, as described herein, may comprise "artificial intelligence" or the ability to decipher a phrase or question from a verbal input and provide an appropriate response. For example, artificial intelligence may be able to determine a verbal input, such as, "Do you want to go for a walk?", and may decipher this phrase and then respond with an appropriate phrase, such as, "I do want to go for a walk!" The personality designer system may provide the user to alter or influence the type of response. For example, a sarcastic personality selection may result in a response to the question about taking a walk with, "It is about time, I've been sitting here all day." The artificial intelligence may also incorporate geographical location and time input to the response. The geographical location and time input may be provided by the remote electronic device, such as a mobile telephone. For example, a person may ask their dog wearing a remote audio object as described herein, "Do you want to go for a walk?" and the artificial intelligence using the time input, such as 5:30 am, may provide a response such as, "It is awful early . . . hit the snooze again" or "Maybe later, I am getting my beauty sleep."

In one embodiment, a personality designer system for a remote audio object, as described herein, may be configured for receiving a user input as to where the remote object is located. For example, the personality designer program may comprise speech recognition software that is configured for a location verbal input when either turned on or when prompted by the user. A person may prompt a remote electronic device to receive location input, and then speak a location, such as dog, or hat, or car, and the selection of phrases, and in some cases the tone or accent of the voice emitted, is configured for the input location. The phrases emitted would correspond to the location inputted by the user. The personality designed by the person may still influence the selection of phrase emitted. For example, if a person inputs a location of a dog, for example, the phrases emitted may include dog related references, such as, "I'm ready for a walk!"

In an exemplary embodiment, a personality designer system for remote audio object comprises a mobile telephone remote electronic device that has an application program comprising the personality designer program. The mobile telephone also comprises speech recognition software and sends a wireless signal via Bluetooth, for example, to a remote audio object for emitting a selection of phrases. In still another exemplary embodiment, the remote audio object is configured on a dog collar. In yet another exemplary embodiment, the mobile telephone is configured to interface with a website, whereby artificial intelligence software analyzes verbal inputs and relays a voice synthesized response back to the mobile phone and subsequently to the remote audio object.

The summary of the invention is provided as a general introduction to some of the embodiments of the invention and is not intended to be limiting. Additional example embodiments, including variations and alternative configurations of the invention, are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1A:
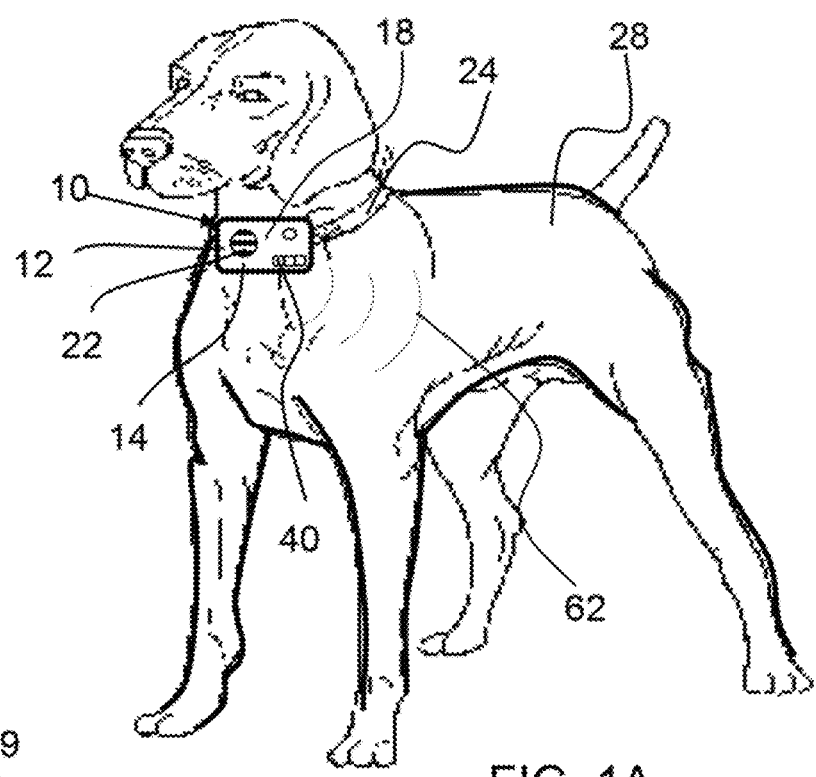

FIG. 1A shows an isometric view a dog wearing a dog collar having an exemplary remote audio object as described herein.

Figure 1B:
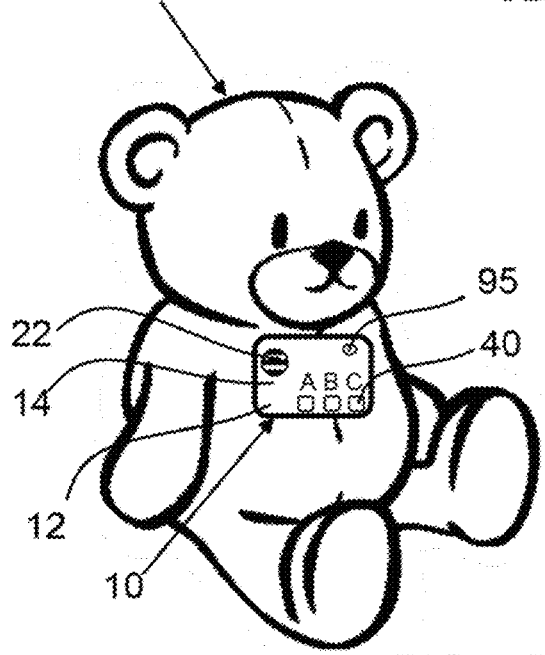

FIG. 1B shows an isometric view a teddy bear having an exemplary remote audio object as described herein.

Figure 2:
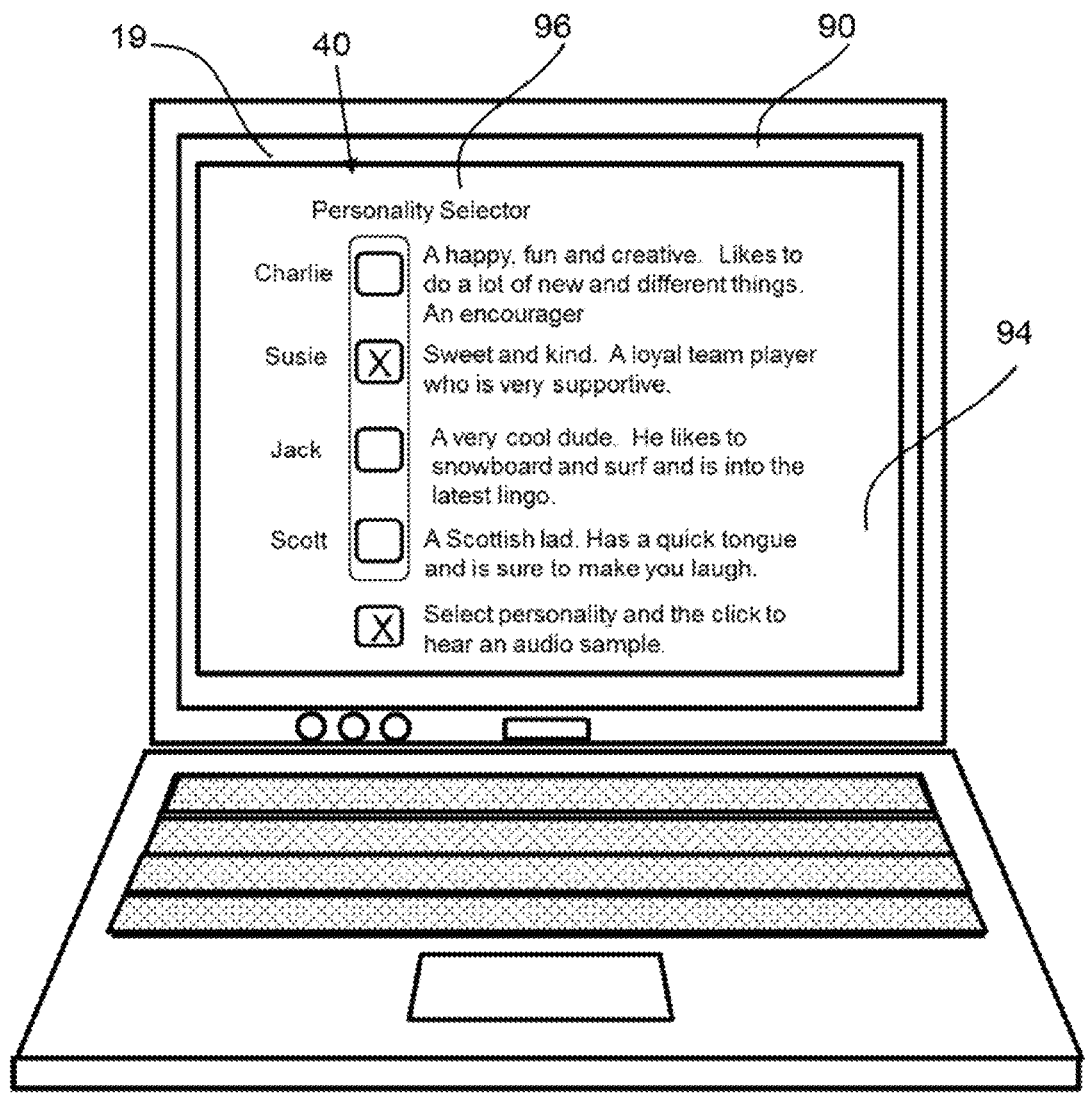

FIG. 2 shows a screen display of an exemplary personality designer program described herein.

Figure 3:
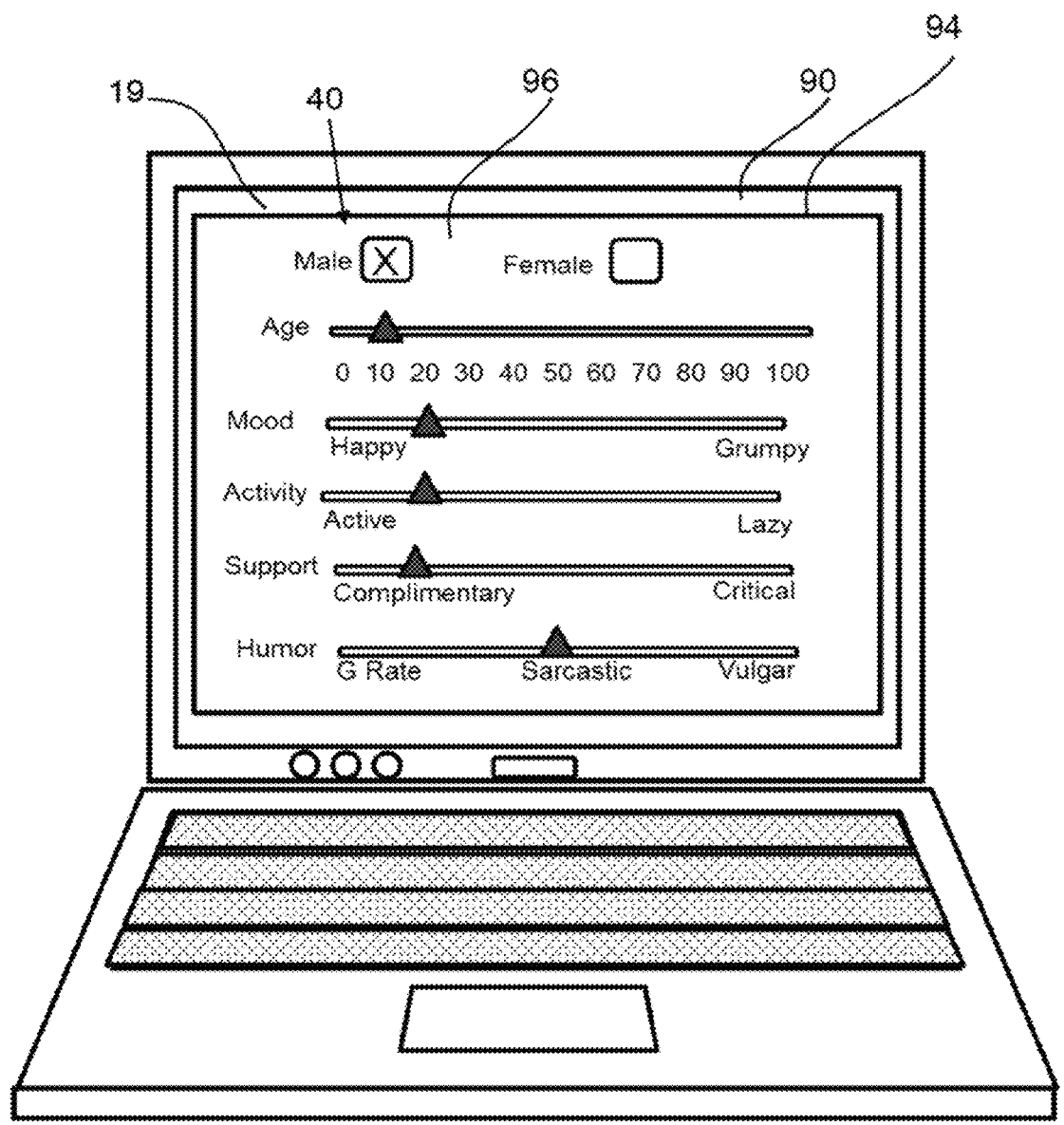

FIG. 3 shows a screen display of an exemplary personality designer program described herein.

Figure 4:
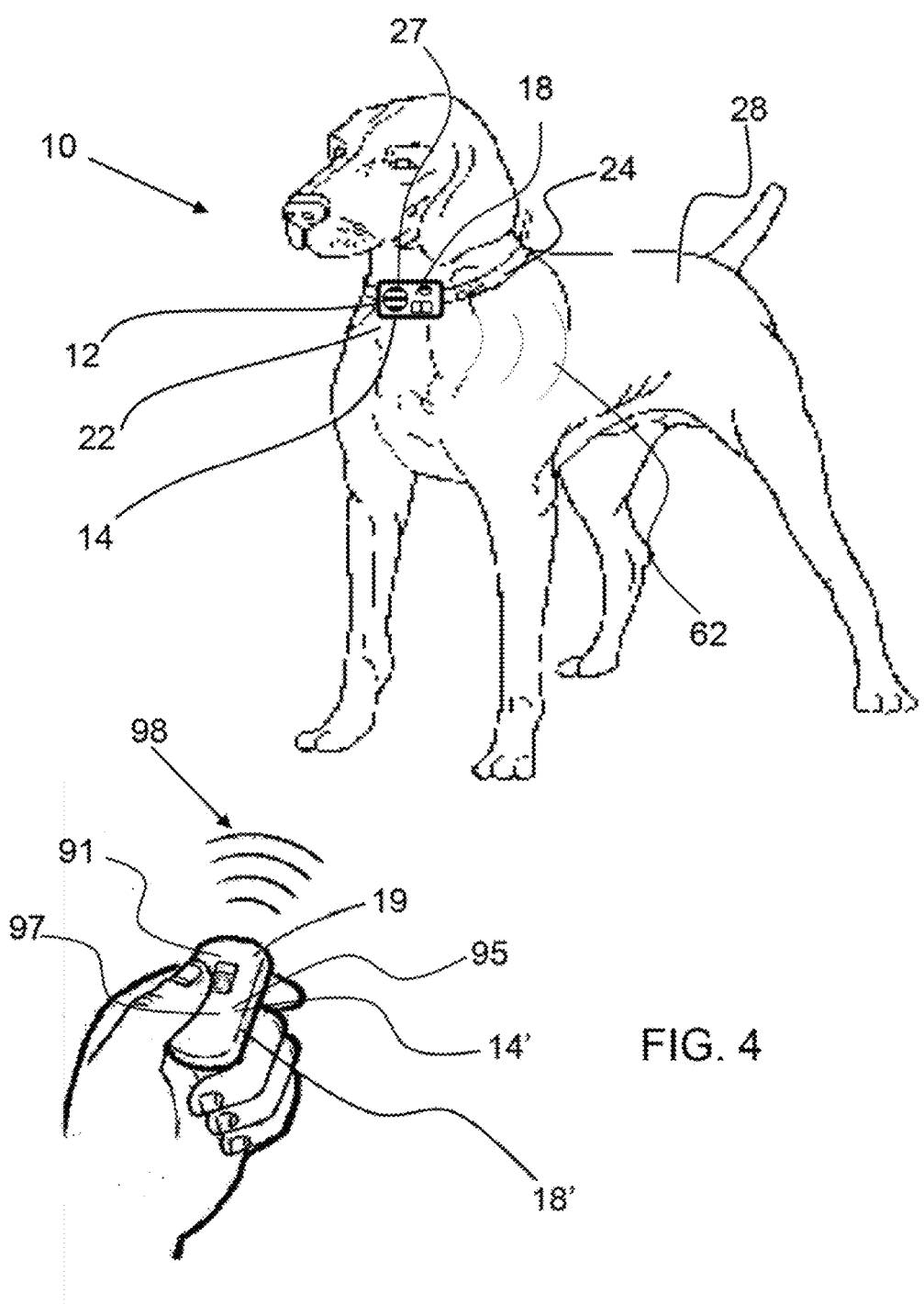

FIG. 4 shows a dog wearing a dog collar having an exemplary remote audio object, and a remote electronic device having an activation feature.

Figure 5A:
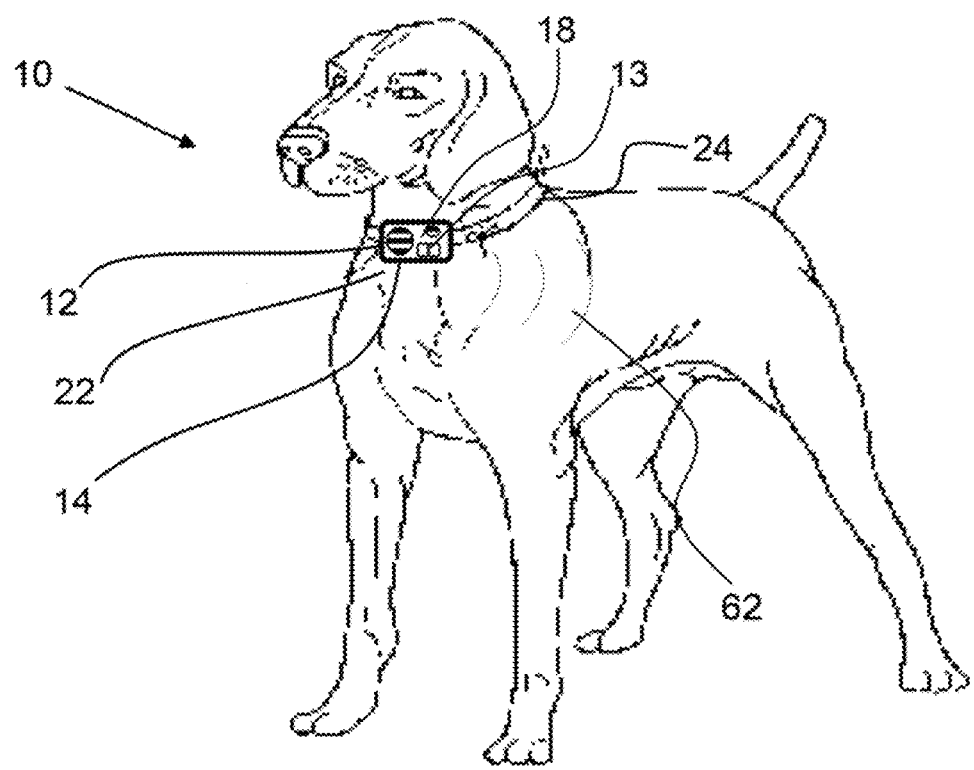

FIG. 5A shows a dog wearing a dog collar having an exemplary remote audio object having an electronic memory.

Figure 5B:
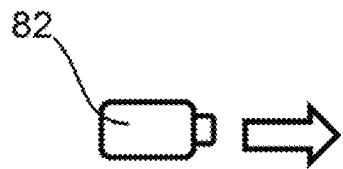

FIG. 5B shows an exemplary portable electronic memory device.

Figure 5C:
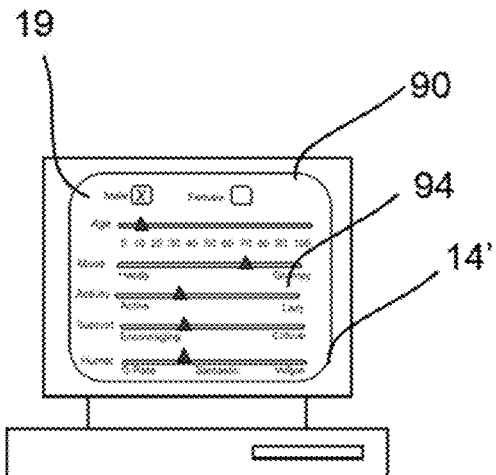
Figure 5C:
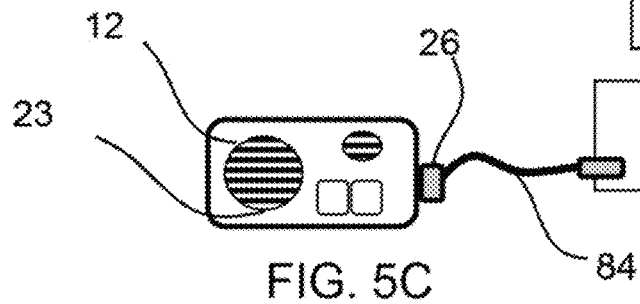

FIG. 5C shows an exemplary remote audio object having an interface feature connected with a remote electronic device.

Figure 6:
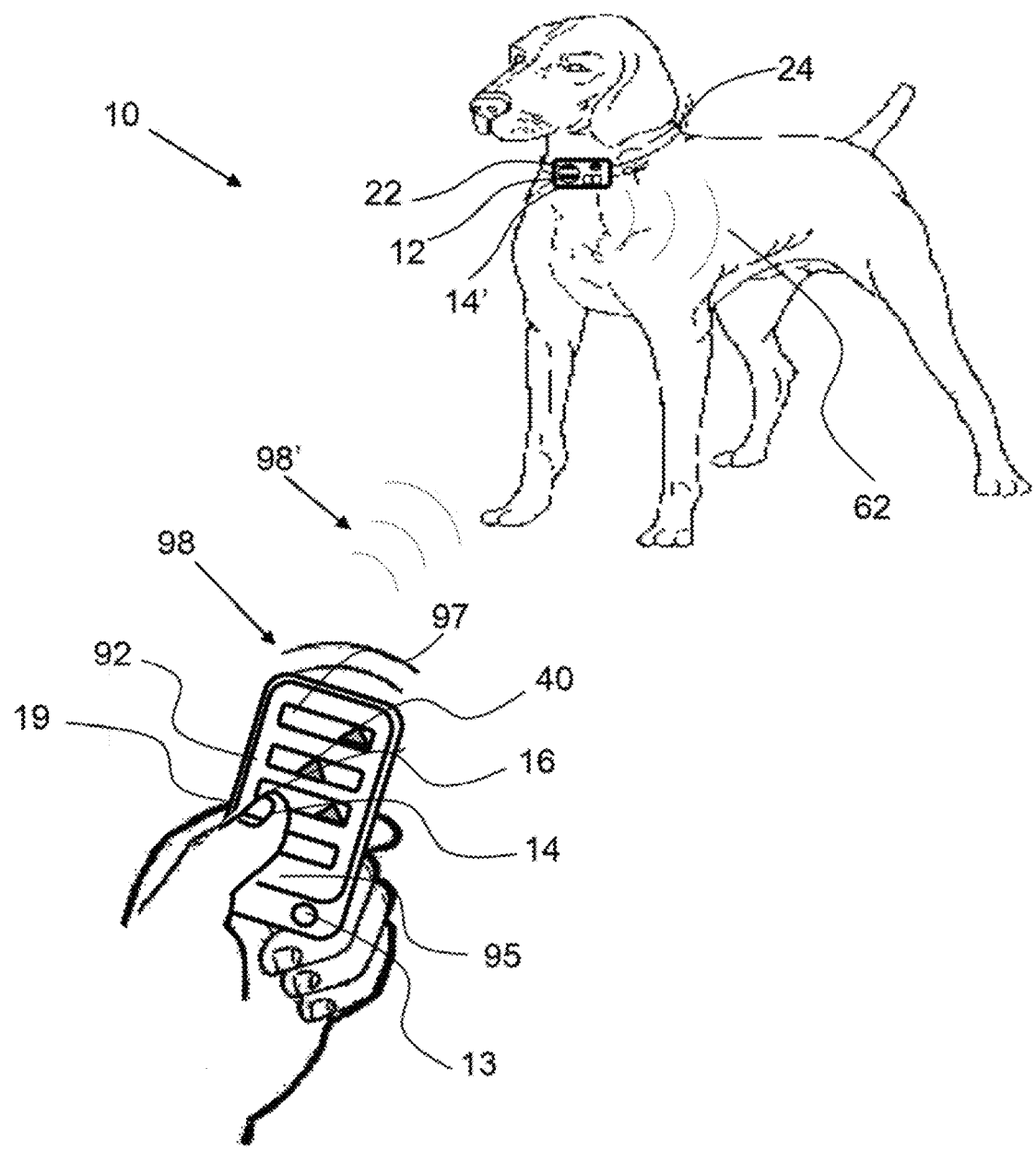

FIG. 6 shows an exemplary remote audio object configured on a dog collar and an exemplary remote electronic device having the personality designer program configured thereon.

Figure 7:
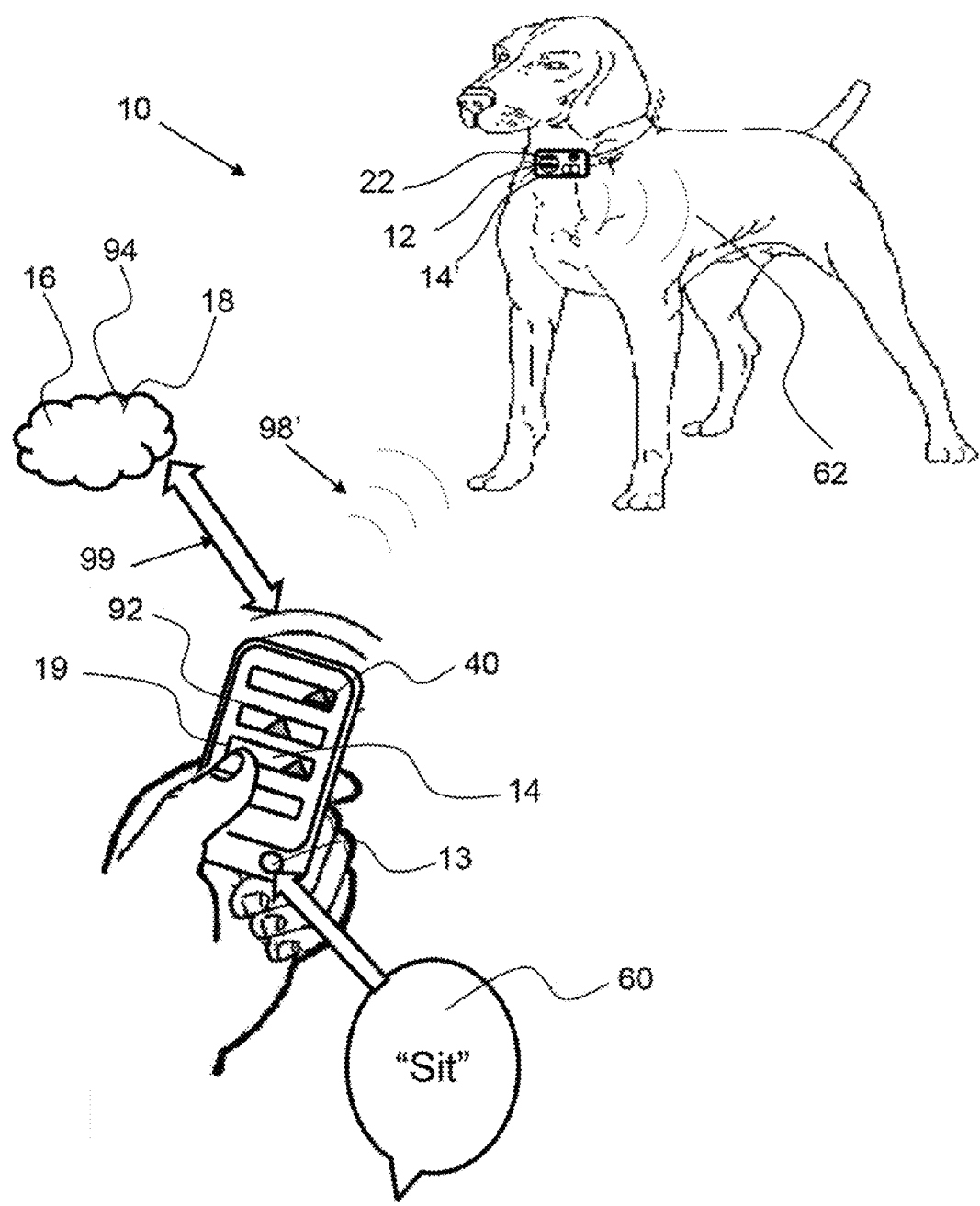

FIG. 7 shows an exemplary remote audio object configured on a dog collar and an exemplary remote electronic device having a microphone and the personality designer program configured thereon, and a website interface.

Figure 8:
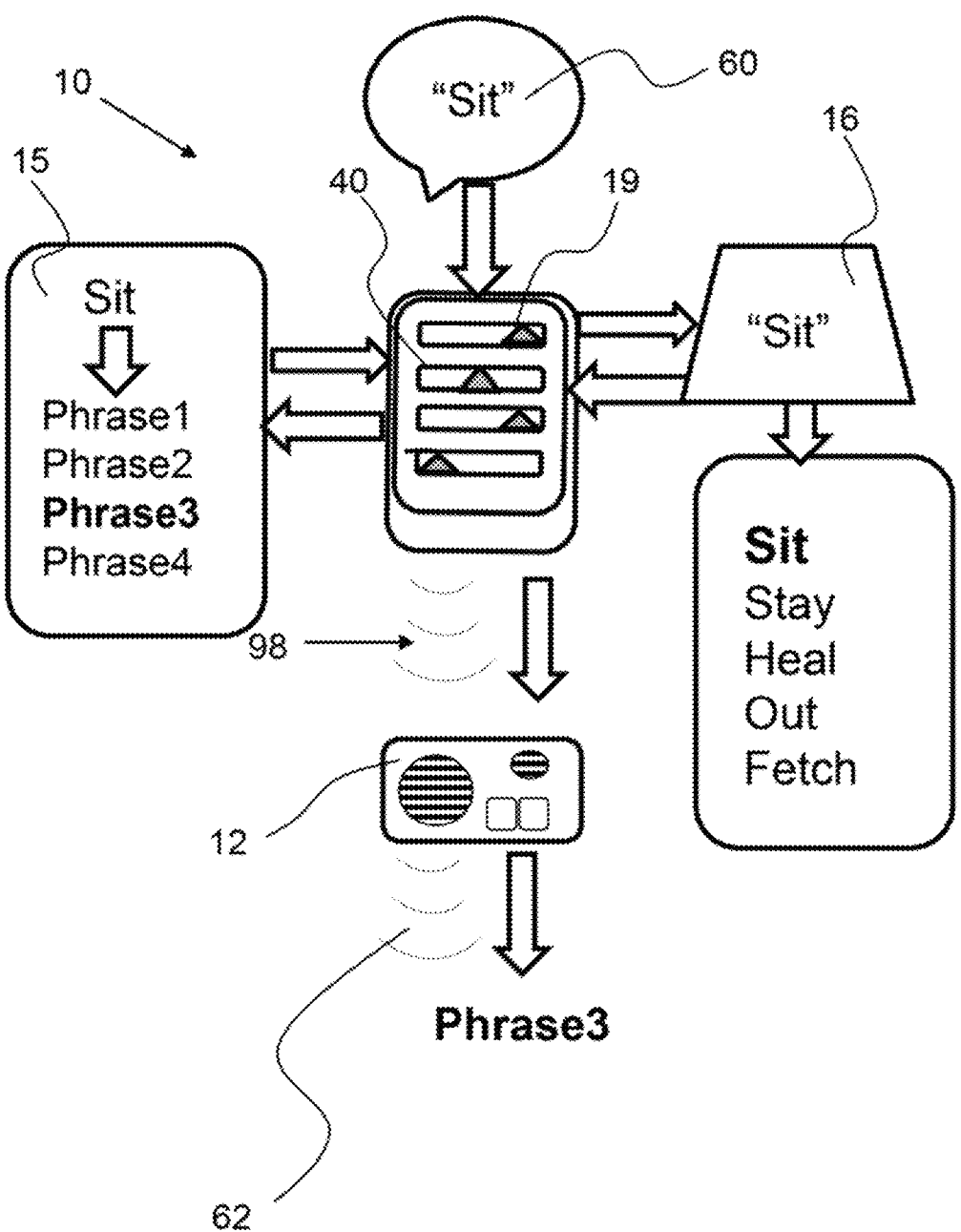

FIG. 8 shows a diagram of how an exemplary personality designer for remote audio objects functions.

Figure 9:
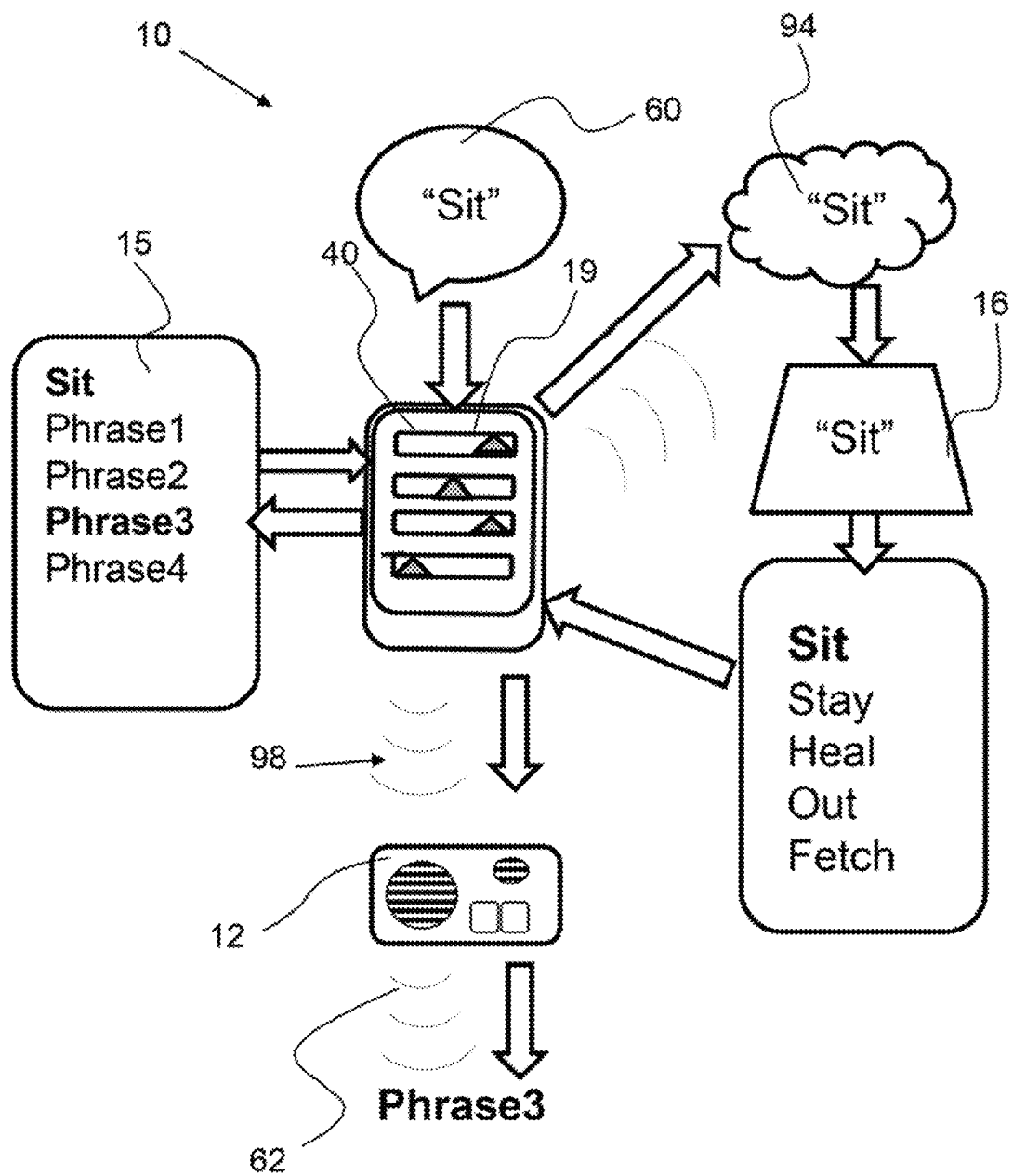

FIG. 9 shows a diagram of how an exemplary personality designer for remote audio objects functions.

Figure 10:
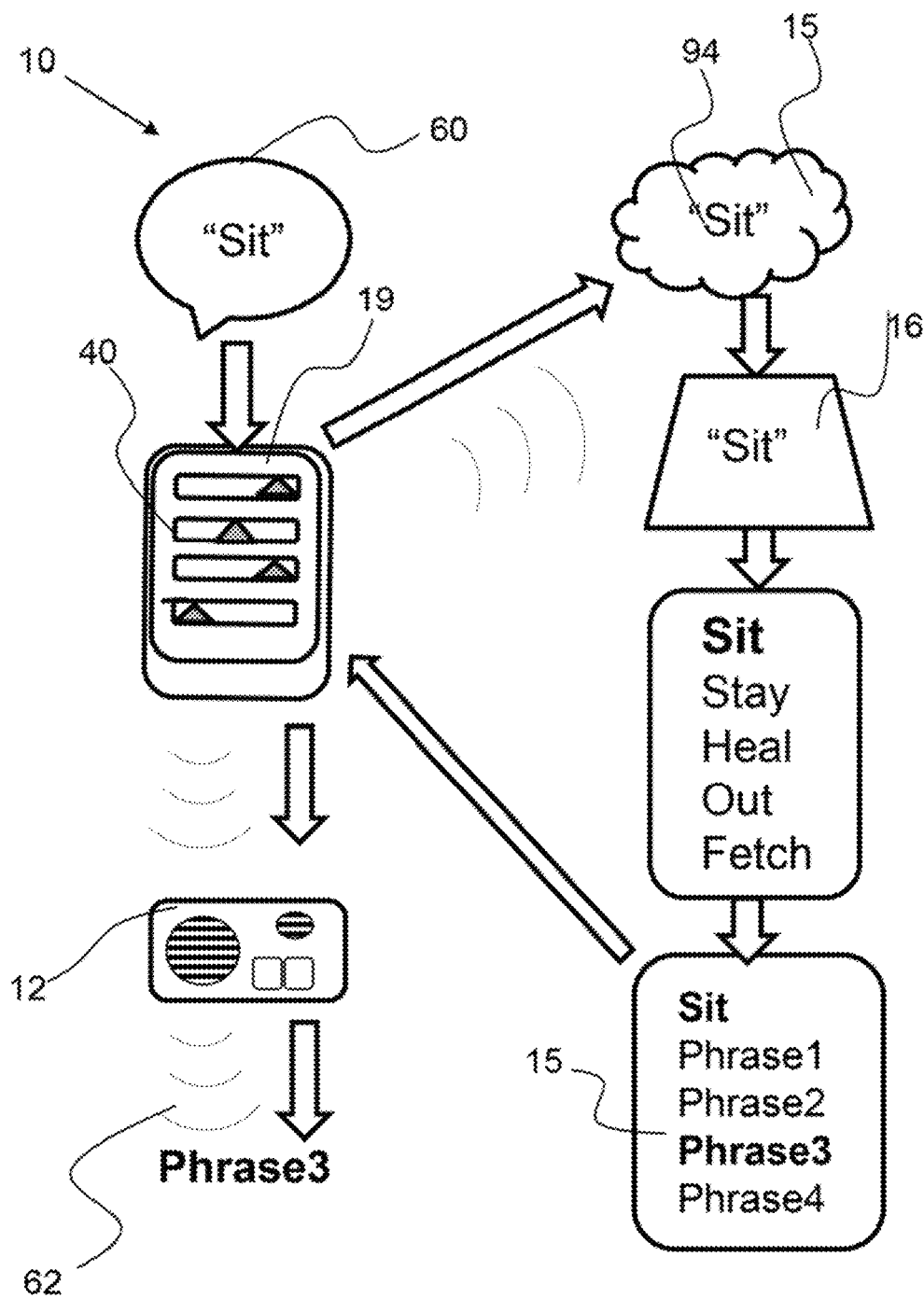

FIG. 10 shows a diagram of how an exemplary personality designer for remote audio objects functions.

Figure 11:
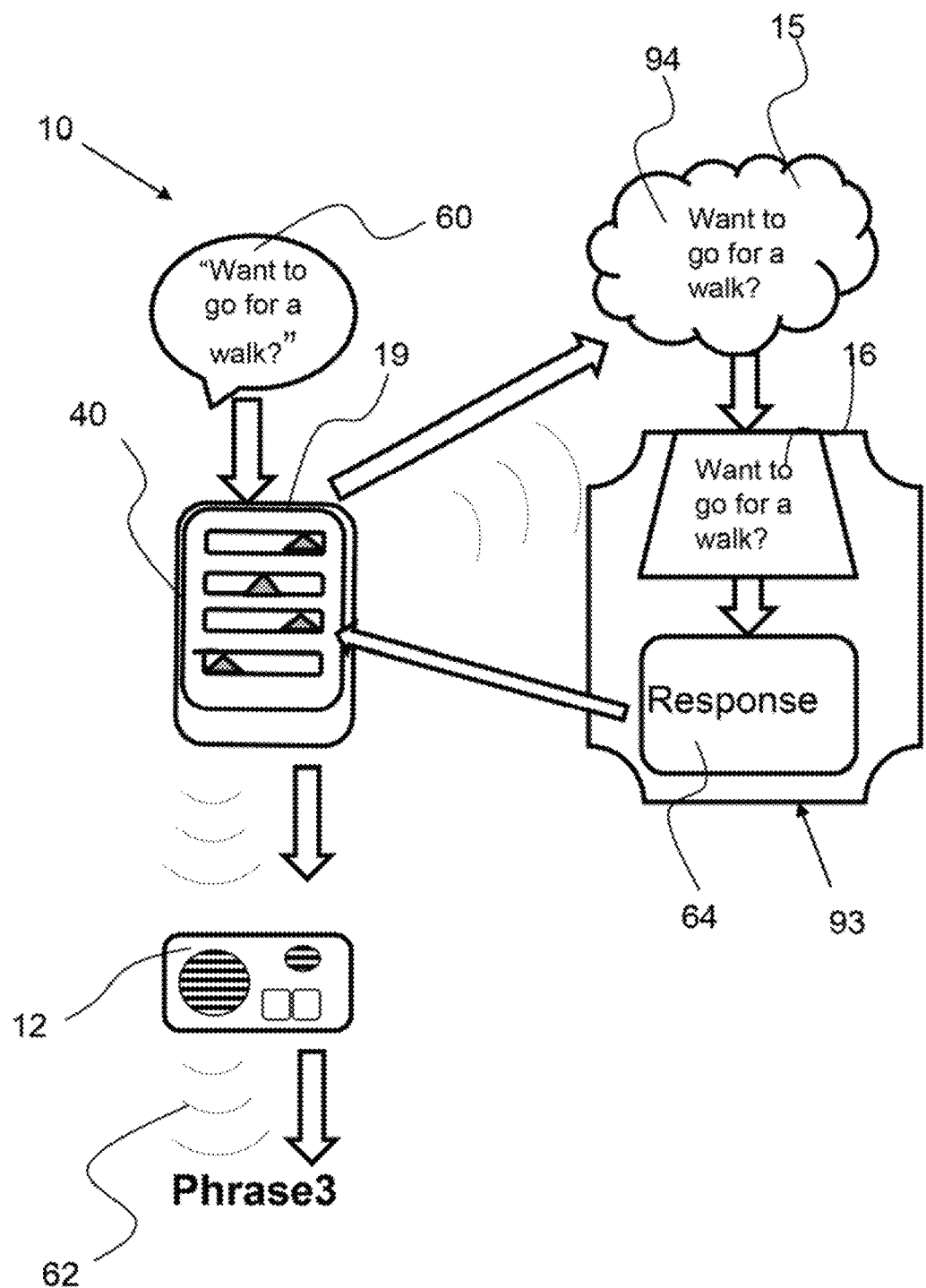

FIG. 11 shows a diagram of how an exemplary personality designer for remote audio objects functions.

FIGS. 12A and 12B show tables that illustrate the trait values assigned to phrases by the personality designer program.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and illustrated in the accompanying figures. The embodiments described are only for purposes of illustrating the present invention and should not be interpreted as limiting the scope of the invention. Other embodiments of the invention, and certain modifications, combinations and improvements of the described embodiments, occur to those skilled in the art and all such alternate embodiments, combinations, modifications and improvements are within the scope of the present invention.

DEFINITIONS

Personality, as used herein, is defined as the plurality of phrases that exemplifies aspects of a character that are emitted by the speaker on the remote audio object. For example, if a person were to design a personality that is complimentary, the plurality of phrases would include a higher number of compliments as opposed to a critical personality, that comprises fewer or no complimentary phrases and may comprise critical phrases.

Selection of phrases, as used herein, is defined as the plurality of phrases that a user selects through the use of one or more of the personality input features described herein.

The phrase, a selection of phrases defines a personality, as used herein, means that the plurality of phrases emitted by the speaker on the remote audio object indicates a personality of the remote audio object by the types and/or frequency of phrases emitted. For example, if a person were to design a personality that is complimentary, the selection of phrases would include a higher number of complimentary type phrases as opposed to a critical personality, that comprises fewer or no complimentary type phrases and may comprise critical type phrases.

Personality input feature, as used herein, is defined as an input feature provided to a user of the personality designer system described herein for selecting the personality of the remote audio object and includes, but is not limited to, a character input feature, a selection input feature, a level input feature, a ranking input feature, a weighted input feature, a personalization input feature, a compilation input feature, and a combination input feature.

Live animal, as used herein, refers to any live animal that the remote audio object may be configured on or near and includes, but is not limited to, pets, dogs, cats, pigs, hamsters, fish, turtles, lizards, horses, birds, and the like. The remote audio object may be place on an animal collar or on or around their cage, or tank, for example. In an exemplary embodiment, the remote audio object is configured on a dog or cat collar. In addition, the selection of phrases, or personality, may be selected to correspond with the type of live animal.

Phrase, as used herein, is defined as a word or series of words that are emitted by the remote audio object.

Response, as used herein, in reference to the a phrase emitted from a remote audio object, is a type of phrase that corresponds to a verbal input, and may be in the form of a question, or answer.

The term "played" may be used to refer to a phrase being emitted by the speaker on the remote audio object.

FIG. 1A shows an exemplary personality designer system for a remote audio object 10; wherein a dog 28 is wearing a dog collar 24 having an exemplary remote audio object 12, as described herein. The remote audio object 12 may be attached to a pet collar or may be detachably attached to a pet collar. The remote audio object shown in FIG. 1 comprises a speaker 22, electronic memory 18, and at least a portion of the control system 14. As shown in FIG. 1, the personality designer program 40 is also configured on the remote audio object. Any combination of components of a personality designer system may be configured on a remote audio object as described herein.

FIG. 1B, shows an exemplary personality designer system for a remote audio object 10; wherein a teddy bear 29 comprises an exemplary remote audio object 12, as described herein.

FIG. 2 shows a screen display 96 of an exemplary personality designer program 40 described herein. The personality designer program 40 shown comprises a plurality of personalities for a person to select. Each personality is described to the user. Any number of personalities may be provided for selection by the personality designer program, including more than four, more than ten, more than twenty, more than fifty, more than 100 and any range between and including the number of personalities listed. In addition, the personality designer program may comprise a sample feature, whereby a person may hear a phrase that a particular personality may include. The personality designer program 40 is shown in FIG. 2 as being displayed on a computer 90, whereby the program is accessed through a website 94. A person may use any suitable electronic device to interface with a personality designer program as described herein.

FIG. 3 shows a screen display 96 of an exemplary personality designer program 40 described herein. In this embodiment, the personality designer program allows the user to input preferences for a plurality of personality traits. As shown at the top of the screen display 96, a user has selected a male personality, and an age of approximately 10. In addition, the user has selected a personality that is more happy than grumpy, more active than lazy, more complimentary than critical, and more sarcastic than vulgar or g-rated. As shown in FIG. 3, a user is provided with a weighted input feature, where they may simply slide a selection preference between two opposing personality traits. Personality traits may be categorized in any suitable way, and a person may interface with the personality designer program to select preferences to various traits in any suitable way. As shown in FIG. 3, a particular personality trait is paired with two opposing types, such as happy and grumpy. A user may provide a weighted input between two opposing traits as shown, or simply select the traits that they want their personality to exhibit. In yet another embodiment, a user may input a numerical value of how much of a particular personality trait they want. For example, a user may be provided with a list of personality traits whereby they can input a number, such as from 1 to 10, corresponding with how much they want that particular trait.

FIG. 4 shows a dog 28 wearing a dog collar 24 having an exemplary remote audio object 12, and a remote electronic device 19 having an activation feature 95. The remote electronic device 19 comprises a signal transmitter 97 that sends a wireless signal 98 so that when it is received by the signal receiver 27 on the remote audio object, a phrase is emitted by the speaker 22. The electronic memory 18 in this embodiment is configured on the remote electronic device 19. The remote electronic device may be configured to send a phrase as shown in FIG. 4, or may be configured to send an electronic code that directs the remote audio object to emit a phrase. The control system for the personality designer system for remote audio objects may be partially configured on the remote audio object and partially on a remote electronic device, as shown in FIG. 4. A remote electronic device may comprise one or more activation features, such as buttons. In addition, the remote electronic device may have a personality designer program configured thereon. For example, the remote electronic device may provide an input mechanism for a user to design a personality.

FIG. 5A shows a dog wearing a dog collar 24 having an exemplary remote audio object 12 having an electronic memory 18. The electronic memory may be configured as a portable electronic memory device 82 as shown in FIG. 5B. A portable electronic memory device 82 may be removed from the remote audio object and a new or altered personality may be loaded onto the portable electronic memory device. For example, a portable electronic memory device may be an SD card or USB memory stick that may be removed from the remote audio object and inserted into a computer or other remote electronic device. As shown in FIG. 5B, the portable electronic memory device 82 may be inserted into a computer 90, and a new or altered personality may be loaded thereon.

FIG. 5C shows an exemplary remote audio object 12 having an interface feature 26 connected with a remote electronic device 19 by an interface cable 84. An interface feature may be any suitable cable that allows for direct connection of a remote audio object 12 with a remote electronic device 19. A universal service bus (USB), cable is an example of a suitable type of interface cable 84.

FIG. 6 shows an exemplary remote audio object 12 configured on a dog collar 24 and an exemplary remote electronic device 19 having the personality designer program configured thereon. In this embodiment of the personality designer system for remote audio object 10, the remote electronic device 19 is a mobile phone 92. The personality designer program 40 is displayed on the mobile phone 92. A user may interface with the mobile phone 92, to select or alter a personality. In addition, the phone may have an activation feature 95 that, when selected by the user, sends a wireless remote object signal 98' from a signal transmitter 97 to the remote audio object 12. The personality designer program may be an application that is loaded onto the mobile phone 19. Furthermore, the remote electronic device may be configured with speech recognition software 16 as shown in FIG. 6. A verbal input may be detected by the microphone 13, and the speech recognition software may detect a particular word that it is programmed to recognize. When the speech recognition detects a word, a particular phrase is sent wirelessly and may be emitted by the speaker 22.

FIG. 7 shows an exemplary remote audio object 12 configured on a dog collar 24 and an exemplary remote electronic device 19 having a microphone 13 and the personality designer program 40 configured thereon, and a website interface 99. A verbal input 60, such as "Sit," may be received through the microphone 13, and then transmitted via the website interface 99 to a website 94 where the verbal input is analyzed by the speech recognition software 16. In one embodiment, the website may transmit a response back to the portable electronic device 19. The portable electronic device may then send the phrase to the remote audio object 12 via a wireless signal 98', as depicted in FIG. 7. The website may be linked or connected with a database or any other suitable computing device for the purposes of storing electronic memory and analyzing verbal inputs with speech recognition software. In particular, the configuration of the personality designer system for remote audio objects 10, shown in FIG. 7, is well suited for an artificial intelligence system where the artificial intelligence software is configured and/or connected with the website. The artificial intelligence software may require a large amount of computing power, and access through a website may be a practical way to achieve quick responses. This configuration is further described in FIG. 11.

FIG. 8 shows a diagram of how an exemplary personality designer for remote audio objects 10 functions. A verbal input 60 is received by a remote electronic device 19. The verbal input is then analyzed by speech recognition software 16 and the verbal input is recognized. The speech recognition software then relays to the control program 15 that a particular word has been identified. The control program 15 selects a phrase from a plurality of phrases and relays this to the remote electronic device 19. The remote electronic device then transmits a wireless signal to the remote audio object 12 which then emits the selected phrase 62. It is to be understood, that the electronic memory for the plurality of phrases may be configured on the remote audio object or the remote electronic object. A phrase selected by the control program may simply be a code that is sent to the remote audio object that specifies a particular phrase.

FIG. 9 shows a diagram of how an exemplary personality designer for remote audio objects 10 functions. A verbal input 60 is received by a remote electronic device 19, which transmits the verbal input to a website 94, having speech recognition software 16. The speech recognition software identifies the word SIT and relays this information back to the remote electronic device 19. The control program 15 configured on the remote electronic device 19 selects phrase 3, as indicated by the bold text, from a plurality of phrases and transmits this phrase to the remote audio object 12. The remote audio object emits the phrase 62 from the speaker.

FIG. 10 shows a diagram of how an exemplary personality designer for remote audio objects 10 functions. A verbal input 60 is received by a remote electronic device 19, which transmits the verbal input to a website 94, having speech recognition software 16 and a control program. The speech recognition software identifies the word "SIT" and relays this information to the control program 15. The control program selects phrase 3, as indicated by the bold text, from a plurality of phrases and transmits this phrase to the remote audio object 12. The remote audio object emits the phrase 62 from the speaker.

FIG. 11 shows a diagram of how an exemplary personality designer for remote audio objects 10 functions. A verbal input 60, "Want to go for a walk?" is received by a remote electronic device 19, which transmits the verbal input to a website 94 having speech recognition software 16, a control program 15, and a synthesizer feature. The speech recognition software identifies the phrase by converting the verbal input to text. The text is the run through an algorithm for analysis and one or more words are identified. A response 64 is generated by the synthesizer as a function of the algorithm analysis of the speech recognition software. The response is transmitted to the remote electronic device 19 that in-turn transmits the response to the remote audio object 12. The speech recognition and response generation in this embodiment are elements of what is defined as artificial intelligence, whereby a synthesized response is generated as a function of verbal input.

FIG. 12A and FIG. 12B show two tables that illustrate the trait values assigned to phrases by the personality designer program. FIG. 12A shows that phrases 1 through 4 have various trait values (0-10) for four illustrating traits: complimentary, critical, encouraging and sarcastic. Phrase 1, "I can't wait for my delicious dinner," is a complimentary and encouraging phrase and therefore has high trait values for these two personality traits, and low trait values for critical and sarcastic. Phrase 2, "Same old crummy food again?" is critical and has a high critical trait value of 10. If a user indicated through one of the personality input features described herein, that they wanted their personality to be complimentary versus critical, then response 1, may more likely be added to their selection of phrase than phrase 2. The control program may have any number of methods of determining what phrases to include based on the user inputs and the trait values. For example, the control program may select phrases with a trait value greater than a threshold value. For example, if a person selected complimentary, or gave complimentary a high input level value, or weighed complimentary greater than critical, then the control program may select phrases having a complimentary trait value of 5 or more for inclusion in the selection of phrases or for further computational consideration. In addition, phrases may have verbal input target words associated with them. As shown in FIG. 12A, a verbal input of "Are you hungry?" may detect the word hungry and subsequently play a phrase that has this target word associated with it. Any number of target words may be associated with a phrase, and in one embodiment, a target word or words have a target word value. Target word values may be used to provide a numerical weight as to how aligned the phrase is with a target word. For example, the target word food may have a higher target word value than breakfast for phrase 1. A phrase with the word breakfast in it, such as, "Yeah, breakfast, I'm hungry" may have a very high breakfast target word value. FIG. 12B is another example of trait values and target words associated with a plurality of phrases.

Prophetic Example 1

A user of an exemplary personality designer for remote audio objects uses a mobile telephone, such as a smartphone, and downloads and/or installs an an exemplary personality designer application program. The personality designer program is designed for a dog-collar remote audio object. The user opens the application on their smartphone and uses a level input feature to provide input levels for a plurality of personality traits. The personality designer application comprises speech recognition software. The user speaks into the smartphone and the speech recognition software analyzes the verbal input for a specific words. The user provides "Hey, want to go for walk?" as the verbal input. The verbal input is translated to text by the speech recognition software. The text is analyzed by the application and the software recognizes the word "walk," The personality designer program then selects an appropriate response from a selection of responses to send to the remote audio object. An appropriate audio response means a response consistent with the personality that the user designed for their dog. The user designed a young male with a friendly and enthusiastic personality, and the appropriate audio response to the user's question "Do you want to go for a walk?" is "Yes, absolutely! I love to go on walks." The response is sent wirelessly, via Bluetooth, to the speaker in the remote audio object on the dog's collar. The audio response is a prerecorded having a young male voice.

Prophetic Example 2

A user of an exemplary personality designer for remote audio objects uses a mobile telephone, such as a smartphone, and downloads and/or installs an exemplary personality designer application program. The personality designer program is designed for a dog-collar remote audio object. The user opens the application on their smartphone and uses a weighted input feature to provide input levels for a plurality of personality traits. The personality designer application is linked with a website that comprises speech recognition software and artificial intelligence. The user speaks into the smartphone and the speech recognition software as well as the artificial intelligence analyzes the verbal input. The user provides "Are there any nice dog parks around here?", as the verbal input. The verbal input is analyzed by the speech recognition software and artificial intelligence and runs a subsequent search for dog parks in the geographical area near the location of the user. The global positioning coordinates of the user are used for the search. The geographical position of the user is known by the personality designer system, via a global positioning system associated with the smartphone. The personality designer system then responds with a voice synthesized response sent form the website to the smartphone. The response, "Let's go to Marshal Park, it is not far away, want me to tell you how to get there?", is then sent from the smartphone to the remote audio object via Bluetooth and emitted by the speaker on the remote audio object. An appropriate audio response means a response consistent with the personality that the user has designed for their dog. The user designed an older Scottish male with a friendly and enthusiastic personality, and the appropriate audio response to the user's question is voice synthesized with a Scottish accent. The user then says "Yes, please tell me how to get there." The personality designer program then produces and sends a response having the directions to Marshal Park It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A personality designer system for a remote audio object comprising:
   a. a remote audio object comprising:
   i. a speaker;
   b. a control system comprising an electronic device comprising:
   i. a display screen;
   ii a user input feature;
   iii. a control program;
   iv. a personality designer program comprising:
      1. a personality input feature wherein two or more personality traits selected from a group comprising of:
   Happy, grumpy, active, sad, humorous, sarcastic, motivating, supportive, critical, polite, rude, vulgar, energetic, lazy, agreeable, confrontational, stubborn, direct, indirect, innocent, streetwise, controlling, kind, angry, confident, enthusiastic, patient, determined, loving, hopeful, sad, anxious, worried, stressed, easy going, relaxed, wound up, bossy, complimentary, encouraging, and mean;
   wherein the two or more personality traits are displayed on said display screen for selection by a user through said user input feature on the electronic device to provide a personality input to the control program;
   v. an electronic memory for storing a plurality of phrases;
   wherein the control program selects from said plurality of phrases, a selection of phrases that define personality as indicated by the personality input, and
   whereby the speaker is configured to emit the selection of the phrases;
   wherein the remote audio object is a detachably attachable object.

2. The personality designer system for a remote audio object of claim 1, further comprising a microphone, wherein the control system further comprises speech recognition software configured to recognize verbal input, and whereby the speaker emits at least one of the selection of phrases as a function of a recognized word or phrase.

3. The personality designer system for a remote audio object of claim 2, wherein the microphone is configured on a remote electronic device, and the speech recognition software is accessed through a website connection with the remote electronic device, whereby when a verbal input is provided to the microphone, the verbal input is transmitted to the website wirelessly where the verbal input is analyzed by the speech recognition software, and when a word is recognized by the speech recognition software, a wireless signal is transmitted to the remote audio object by the remote electronic device and the speaker on the remote audio object emits at least one of the selection of phrases.

4. The personality designer system for a remote audio object of claim 3, wherein the at least one of the selection of phrases is transmitted by the website to the remote electronic device, and subsequently to the remote audio object.

5. The personality designer system for a remote audio object of claim 4, wherein the verbal input is analyzed by an artificial intelligence software, and at least one of a selection of responses is provided by the artificial intelligence to the remote electronic device, and subsequently to the remote audio object.

6. The personality designer system for a remote audio object of claim 2, wherein the speech recognition software is configured to recognize at least 20 words.

7. The personality designer system for a remote audio object of claim 2, wherein the microphone and speech recognition software are configured on a remote electronic device, whereby when a verbal input to the microphone is recognized by the speech recognition software, a wireless signal is transmitted to the remote audio object by the remote electronic device and the speaker on the remote audio object emits at least one of the selection of phrases.

8. The personality designer system for a remote audio object of claim 1, further comprising a remote electronic device comprising a wireless signal transmitter for activating the speaker to emit at least one of the selection of phrases.

9. The personality designer system for a remote audio object of claim 8, wherein the personality designer program is configured on the remote electronic device.

10. The personality designer system for a remote audio object of claim 9, wherein the remote electronic device is a mobile electronic device.

11. The personality designer system for a remote audio object of claim 9, wherein the remote electronic device is configured to access the personality designer program through a website.

12. The personality designer system for a remote audio object of claim 8, wherein the remote electronic device comprises at least one activation feature, whereby selection of the at least one activation feature activates the speaker on said remote audio object to emit at least one of the selection of phrases.

13. The personality designer system for a remote audio object of claim 8, wherein a microphone is configured on the remote electronic device.

14. The personality designer system for a remote audio object of claim 1, wherein the personality input feature comprises a level input feature;
   wherein the user, utilizing the user interface, inputs a level input for each of said two or more personality traits displayed err the display screen of the electronic device; and
   wherein the control program utilizes said level input in an algorithm to select the selection of phrases that define a personality as indicated by the level input.

15. The personality designer system for a remote audio object of claim 14, wherein the level input is a numerical input.

16. The personality designer system for a remote audio object of claim 1, wherein the selection of phrases comprise pre-recorded phrases.

17. The personality designer system for a remote audio object of claim 1, wherein the selection of phrases comprises voice synthesized phrases.

18. The personality designer system for a remote audio object of claim 1, wherein the personality input feature comprises a selection input feature that presents to the user at least three different personality traits on the display screen;
   wherein the user selects at least two of the at least three personality traits to provide a selected personality input; and
   wherein the control program utilizes the selected personality input by the user or the selection of phrases.

19. The personality designer system for a remote audio object of claim 1, wherein the personality designer program is configured on the remote audio object.

20. The personality designer system for a remote audio object of claim 1, wherein a microphone is configured on the remote audio object.

21. The personality designer system for a remote audio object of claim 1, wherein the remote audio object is configured on a pet collar that is detachably attachable to a pet.

22. The personality designer system for a remote audio object of claim 1, wherein the selection of phrases are live animal related phrases.

23. The personality designer system for a remote audio object of claim 1, further comprising a global positioning system and wherein at least one of the selection of phrases emitted by the remote audio object geographically contextual.

24. The personality designer system for a remote audio object of claim 1 wherein at least one of the selection of phrases emitted by the remote audio object is time contextual.

25. The personality designer system for a remote audio object of claim 1, wherein the personality input feature comprises a ranking input feature;
   wherein the user, utilizing the user interface, inputs a ranking input for each of said two or more personality traits displayed on the display screen of the electronic device by inputting a ranking of a first displayed personality trait with respect to a second displayed personality trait; and
   wherein the control program utilizes said ranking input in an algorithm to select the selection of phrases that define a personality as indicated by the ranking input.

26. The personality designer system for a remote audio object of claim 1, wherein the personality input feature comprises a weighted input feature;
   wherein the user, utilizing the user interface, inputs a weighted input for a plurality of personality traits displayed on the display screen, wherein a first and an opposing second personality trait are displayed on the display screen and said weighted input feature is displayed between said first and opposing second personality traits; and
   wherein the control program utilizes said weighted input in an algorithm to select the selection of phrases that define a personality as indicated by the weighted input.

27. The personality designer system for a remote audio object of claim 1, wherein the personality input feature comprises compilation input feature, wherein at least a portion of the plurality of phrases are displayed to the user on the display screen and the user selects one or more of the plurality of phrases for inclusion in the selection of phrases.

28. A personality designer system for a remote audio object comprising:
   a. a remote audio object comprising:
      i. a speaker;
   b. a control system comprising a remote electronic device comprising:
      i. a display screen;
      ii a user input feature;
      iii. a control program;
      iv. a wireless signal transmitter;
      v. a microphone,
      vi. a personality designer program comprising:
         1. a personality input feature wherein four or more personality traits selected from a group comprising of:
      Happy, grumpy, active, sad, humorous, sarcastic, motivating, supportive, critical, polite, rude, vulgar, energetic, lazy, agreeable, confrontational, stubborn, direct, indirect, innocent, streetwise, controlling, kind, angry, confident, enthusiastic, patient, determined, loving, hopeful, sad, anxious, worried, stressed, easy going, relaxed, wound up, bossy, complimentary, encouraging, and mean;
      are displayed on said display screen for selection by a user through said user input feature on the electronic device to provide a personality input to the control program;
         vii. an electronic memory for storing a plurality of phrases;
      wherein the control program selects from said plurality of phrases, a selection of phrases that define personality as indicated by the personality input, and
      whereby the speaker is configured to emit the selection of the phrases;
      and wherein the control system further comprise speech recognition software configured to recognize verbal input, and whereby the speaker emits at least one of the selection of phrases as a function of recognized word or phrase;

wherein the remote audio object is a detachably attachable object.

* * * * *